United States Patent
Hands

(10) Patent No.: US 10,289,500 B2
(45) Date of Patent: *May 14, 2019

(54) ACCELERATED DATA RECOVERY IN A STORAGE SYSTEM

(71) Applicant: Intel Corporation, Santa Clara, CA (US)

(72) Inventor: Jonmichael P. Hands, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 109 days.

This patent is subject to a terminal disclaimer.

(21) Appl. No.: 15/398,651

(22) Filed: Jan. 4, 2017

(65) Prior Publication Data

US 2017/0212814 A1    Jul. 27, 2017

Related U.S. Application Data

(63) Continuation of application No. 14/568,417, filed on Dec. 12, 2014, now Pat. No. 9,575,853.

(51) Int. Cl.
*G06F 11/00* (2006.01)
*G06F 11/16* (2006.01)
(Continued)

(52) U.S. Cl.
CPC ...... *G06F 11/1662* (2013.01); *G06F 11/2082* (2013.01); *G06F 13/42* (2013.01);
(Continued)

(58) Field of Classification Search
CPC ............. G06F 11/1662; G06F 11/2082; G06F 11/2094; G06F 11/0727; G06F 11/1612;
(Continued)

(56) References Cited

U.S. PATENT DOCUMENTS

| 8,667,248 B1 | 3/2014 | Neppalli |
| 2005/0102552 A1 | 5/2005 | Horn |

(Continued)

FOREIGN PATENT DOCUMENTS

WO    2005-109167 A2    11/2005

OTHER PUBLICATIONS

International Preliminary Report on Patentability and Written Opinion issued in PCT Application No. PCT/US2015/060632, dated Jun. 22, 2017, 11 pages.

(Continued)

*Primary Examiner* — Joseph D Manoskey
(74) *Attorney, Agent, or Firm* — Grossman, Tucker, Perreault & Pfleger, PLLC

(57) ABSTRACT

One embodiment provides a storage system. The storage system includes storage system control logic to identify at least one target storage device in response to detection of a failed storage device, request a state of a target device logical block address (LBA) from each of the at least one target storage device, and read data associated with a mapped device LBA from each target storage device and write the data to at least one replacement storage device. Another embodiment provides a storage device. The storage device includes device control logic to determine a state of a target device logical block address (LBA) in response to a request; a host interface to provide a reply to the request, the reply including a state indicator related to the state of the target device LBA; a map table including a plurality of device LBAs and respective state indicators; and non-volatile memory (NVM) including data related to at least one mapped LBA.

25 Claims, 3 Drawing Sheets

(51) Int. Cl.
*G06F 11/20* (2006.01)
*G06F 13/42* (2006.01)

(52) U.S. Cl.
CPC .... *G06F 11/2094* (2013.01); *G06F 2201/805* (2013.01); *G06F 2201/82* (2013.01); *G06F 2213/0036* (2013.01)

(58) Field of Classification Search
CPC .............. G06F 11/201; G06F 11/2023; G06F 11/2053; G06F 13/42; G06F 2201/805; G06F 2201/82; G06F 2213/0036
See application file for complete search history.

(56) References Cited

U.S. PATENT DOCUMENTS

| | | | |
|---|---|---|---|
| 2009/0271659 A1 | 10/2009 | Troppens et al. | |
| 2010/0125751 A1* | 5/2010 | McKean | G06F 11/1662 714/5.1 |
| 2011/0029716 A1 | 2/2011 | Moshayedi | |
| 2012/0317391 A1 | 12/2012 | Driever | |
| 2013/0007511 A1 | 1/2013 | Gaertner et al. | |
| 2013/0290609 A1* | 10/2013 | Lee | G06F 12/0246 711/103 |
| 2013/0290618 A1* | 10/2013 | Werner | G06F 11/1044 711/103 |
| 2014/0297926 A1* | 10/2014 | Ono | G06F 3/0688 711/103 |
| 2016/0092309 A1 | 3/2016 | Gao et al. | |
| 2016/0246678 A1* | 8/2016 | Galbraith | G06F 3/0619 |

OTHER PUBLICATIONS

International Search Report and Written Opinion issued in PCT Application No. PCT/US2015/060632, dated Feb. 26, 2016, 14 pages.
Office Action issued in U.S. Appl. No. 14/568,417 dated Jun. 16, 2016, 18 pages.
Notice of Allowance issued in U.S. Appl. No. 14/568,417 dated Oct. 5, 2016, 9 pages.

* cited by examiner

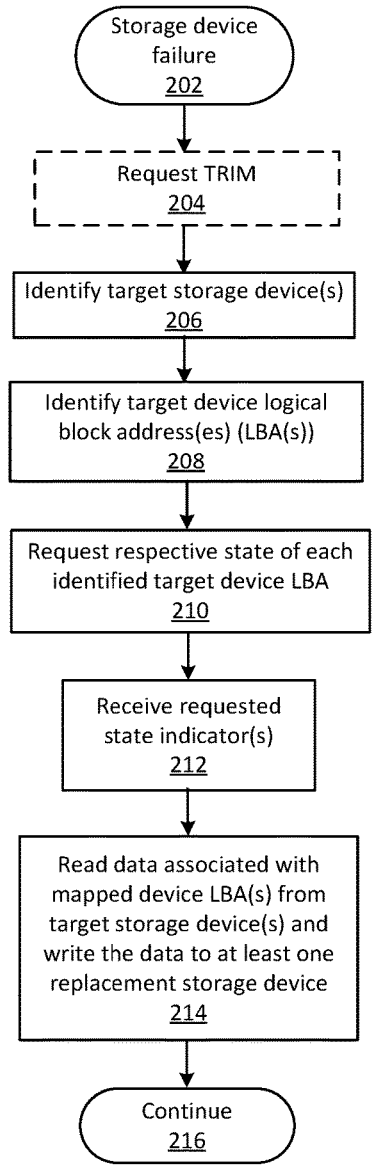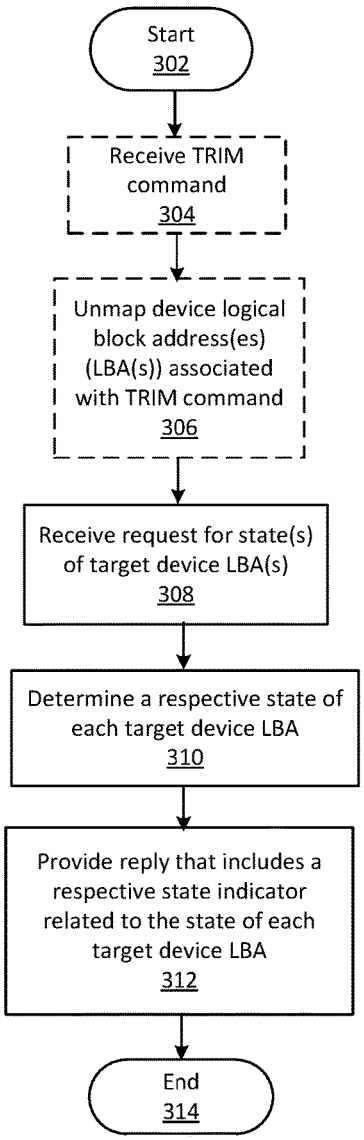
FIG. 2
FIG. 3

ACCELERATED DATA RECOVERY IN A STORAGE SYSTEM

CROSS-REFERENCE TO RELATED APPLICATION

The present application is a continuation of U.S. patent application Ser. No. 14/568,417 filed Dec. 12, 2014, the entire disclosure of which is incorporated herein by reference.

FIELD

The present disclosure relates to accelerated data recovery, in particular to, accelerated data recovery in a storage system.

BACKGROUND

RAID (redundant array of independent (inexpensive) disks) systems include a plurality of storage devices configured to provide improved performance and/or fault tolerance relative to a single storage device. In redundant storage systems (e.g., RAID systems above level 0), one or more copies of data and/or parity information may be stored on a plurality of storage devices. Data stored on a failed storage device may be recovered from the cop(ies) and/or related parity information and stored on a replacement storage device. Such recovery and storage operations are known as "rebuilding". Generally, rebuilding a failed storage device includes writing an entire address space of the failed storage device from the cop(ies) to the replacement storage device. As storage capacities of storage devices increase, the time duration of rebuild operations for a failed storage device also increases.

BRIEF DESCRIPTION OF DRAWINGS

Features and advantages of the claimed subject matter will be apparent from the following detailed description of embodiments consistent therewith, which description should be considered with reference to the accompanying drawings, wherein:

FIG. 2 is a flowchart of accelerated data recovery operations according to various embodiments of the present disclosure;

FIG. 3 is a flowchart of storage device operations according to various embodiments of the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure relates to accelerated recovery methods (and systems) in a storage system. The storage system may include a plurality of storage devices configured to provide fault tolerance. In response to a failure of a storage device, the methods (and systems) are configured to query one or more other storage device(s) to identify mapped logical block addresses (LBAs) related to the failed storage device.

The methods and systems are further configured to provide an accelerated rebuild of a replacement storage device by reading and writing (i.e., copying) data associated with mapped LBA(s). In other words, rather than copying contents of all storage elements associated with the failed storage device to the replacement storage device, the contents of storage elements associated with mapped LBA(s) may be copied. Thus, a time duration associated with rebuilding the failed storage device may be reduced relative to copying an entire span (i.e., range of LBAs available for user data) of a storage device. By querying the storage device(s), i.e., by requesting state(s) of device LBA(s) from the storage device(s), such rebuilds may be performed independent of existence and/or type of file system that may be resident on a host computing device coupled to the storage system. Such rebuilds may also be performed independent of partitioning of the storage system by, e.g., an operating system (OS).

As used herein, an unmapped device LBA is a storage device LBA that has not been written to or has been subject to a trim command (TRIM) and has not been written to since the TRIM, as described herein. A mapped device LBA is a storage device LBA that has been written to and has not been subject to a TRIM since being written to. Mapped and unmapped, as applied to a device LBA, correspond to respective states of the device LBA. Mapping within a storage device is configured to relate a device LBA to a physical block address (PBA) associated with a physical storage medium included in the storage device. Mapping may also be used to relate a host LBA to a device LBA.

Figure 1:
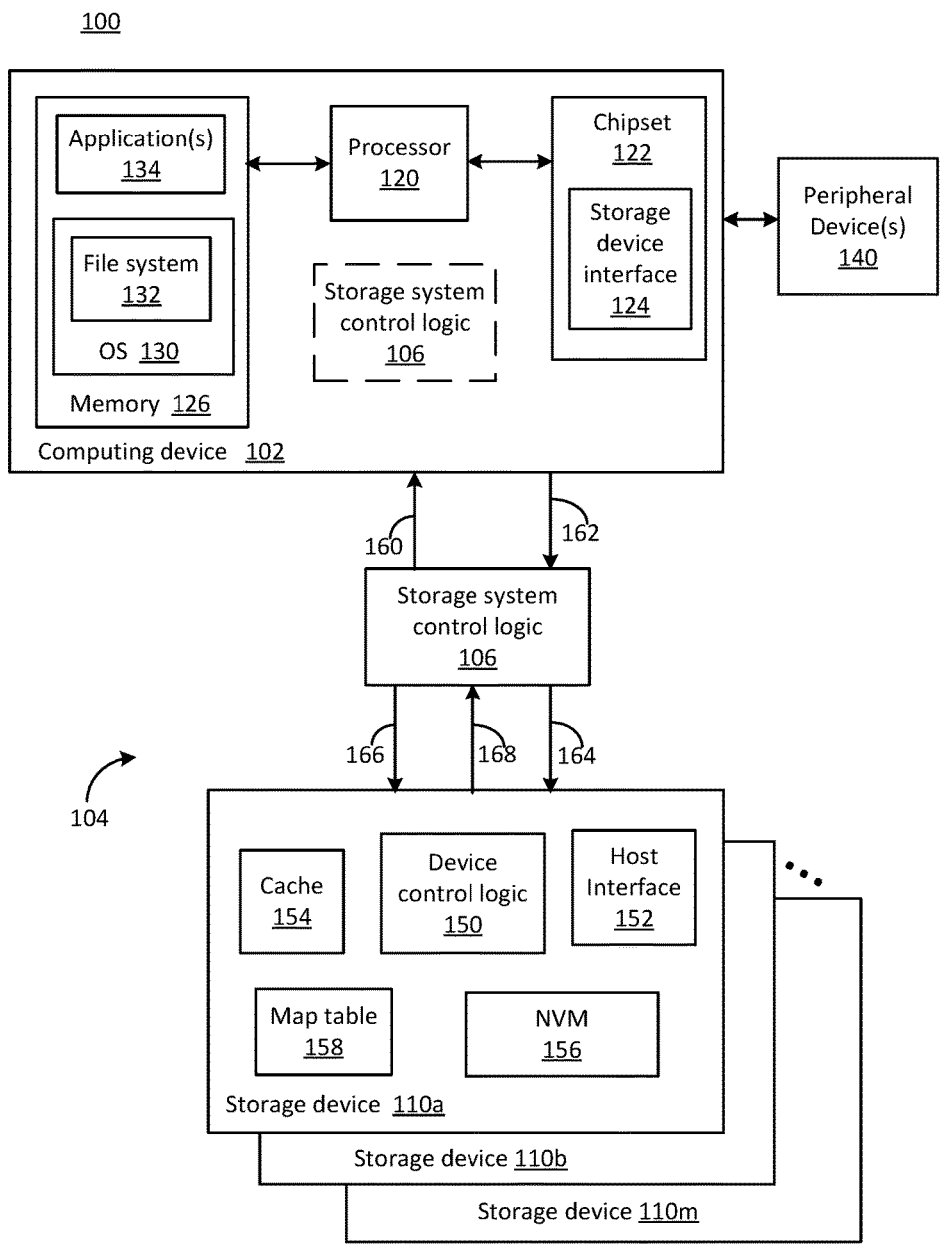
FIG. 1 illustrates a functional block diagram of a system consistent with various embodiments of the present disclosure.

FIG. 1 illustrates a functional block diagram of a system 100 consistent with various embodiments of the present disclosure. System 100 includes a computing device 102 and a storage system 104. The storage system 104 includes storage system control logic 106 and one or more storage device(s) 110a, 110b, . . . , 110m. System 100 may include one or more peripheral device(s) 140 coupled to computing device 102. Computing device 102 may include, but is not limited to, a server, a workstation computer, a desktop computer, a laptop computer, a tablet computer (e.g., iPad®, GalaxyTab® and the like), an ultraportable computer, an ultramobile computer, a netbook computer and/or a subnotebook computer; a mobile telephone including, but not limited to a smart phone, (e.g., iPhone®, Android®-based phone, Blackberry®, Symbian®-based phone, Palm®-based phone, etc.) and/or a feature phone.

Computing device 102 includes a processor 120, a chipset 122 and a memory 126. Processor 120 may include one or more processing unit(s) (e.g., processor(s) and/or core(s)) and is configured to perform operations associated with computing device 102. Chipset 122 may include a storage device interface 124. Chipset 122 and/or storage device interface 124 may be configured to couple processor 120 to storage system 104, storage system control logic 106 and/or peripheral device(s) 140. Storage device interface 124 may be configured to communicate with storage system 104, storage system control logic 106 and/or peripheral device(s) 140 via one or more interface and/or interconnect protocols, e.g., PCIe® (Peripheral Component Interconnect Express), SAS (Serial Attached SCSI (Small Computer System Interface)), ATA (Advanced Technology Attachment), SATA (Serial ATA), NVMe (Non-Volatile Memory Host Controller Interface Express), etc. Peripheral device(s) 140 may include, for example, user interface device(s) including a display, a touch-screen display, printer, keypad, keyboard, etc., communication logic, wired and/or wireless, other storage device(s) including hard disk drives, solid-state drives, removable storage media, etc.

Memory 126 may include cache and/or random access memory. Memory 126 is configured to store an OS 130 and one or more application(s) 134. The application(s) 134 may be configured to initiate memory access operations related to storage system 104. OS 130 may include a file system 132. File system 132 is configured to manage file storage and/or retrieval for computing device 102. For example, file system 132 may be included in a storage stack that includes one or more of the interface and/or interconnect protocols, storage system control logic 106 and storage system 104 (e.g., storage device 110a and/or device control logic 150, as described herein).

Storage system 104 includes one or more storage device(s) 110a, 110b, . . . , 110m. For example, the storage devices 110a, 110b, . . . , 110m may include, but are not limited to, solid state drives (SSDs), hard disk drives (HDD), etc. Each storage device, e.g., storage device 110a, includes device control logic 150, a host interface 152, a cache memory 154, a non-volatile memory (NVM) 156 and a map table 158. Cache memory 154 may include non-volatile memory, as described herein, or volatile memory, e.g., dynamic random access memory (DRAM), synchronous DRAM (SDRAM), etc. Device control logic 150 is configured to manage operations of storage device 110a. Device control logic 150 is configured to write data to and read data from NVM 156. NVM 156 is configured to store user data, parity information and/or NVM operational information. NVM operational information may include logic associated with operation of storage device 110a and/or metadata. NVM 156 includes a plurality of storage elements that may be organized in pages and/or blocks. Block(s) of storage elements in NVM 156 may be identified by physical block address(es) (PBA(s)). Data received from computing device 102 and/or storage system control logic 106 may be identified by device LBA(s). Device control logic 150 may be configured to relate each device LBA to a respective PBA and store the result in map table 158. Map table 158 may further include a state indicator associated with each device LBA. Map table 158 may be resident in NVM 156 and/or cache 154. The state indicator may have two values that correspond to a mapped device LBA (e.g., logic one) and an unmapped device LBA (e.g., logic zero), respectively. For example, device control logic 150 may be configured to set the associated state indicator to logic one when a respective device LBA is written to (i.e., mapped) and reset the associated state indicator from logic one to logic zero when a previously mapped device LBA becomes unmapped. Thus, map table 158 may be utilized by device control logic 150 to identify a state of each device LBA(s), as described herein.

Storage device(s) 110a, 110b, . . . , 110m may correspond to hard disk drive(s) (HDD(s)) and/or solid state drive(s) (SSD(s)). For storage devices that are HDDs, NVM 156 may include ferromagnetic material. For storage devices that are SSDs, NVM 156 may include, but is not limited to, magnetoresistive random access memory (MRAM), phase change memory (PCM, PRAM), three dimensional crosspoint memory, resistive memory, ferroelectric memory (F-RAM, FeRAM), spin-transfer torque memory (STT), thermal assisted switching memory (TAS), millipede memory, floating junction gate memory (FJG RAM), magnetic tunnel junction (MTJ) memory, electrochemical cells (ECM) memory, binary oxide filament cell memory, interfacial switching memory, battery-backed RAM, NAND flash memory, etc.

Host interface 152 is configured to receive commands and/or data from computing device 102 and/or storage system control logic 106 and to transmit responses (i.e., replies) and/or data to computing device 102 and/or storage system control logic 106. Host interface 152 may be configured to couple storage device 110a to storage system control logic 106 and/or host device 102. Host interface 152 may comply and/or be compatible with one or more interface and/or interconnect protocol(s), as described herein. Host interface 152 may be further configured to decode received commands and/or data and to provide the decoded commands and/or data to device control logic 150. Host interface 152 may be further configured to encode data and/or response(s) from device control logic 150 to a format (and/or syntax) that complies and/or is compatible with the interface and/or interconnect protocol(s). Cache 154 is configured to store commands and/or data. Commands and/or data may be stored in cache 154 prior to decoding and/or prior to encoding. Received data, e.g., data received from computing device 102, may be stored in cache 154 prior to being written to NVM 156. Thus, host interface 152 may provide an interface, interconnect and/or communication between storage device 110a and computing device 102 and/or storage system control logic 106.

Storage system control logic 106 may be resident in storage system 104, may be coupled between computing device 102 and storage system 104 and/or may be resident in computing device 102. Storage system control logic 106 is configured to manage memory access operations (e.g., read and/or write operations) between computing device 102, storage system 104 (and storage devices 110a, 110b, . . . , 110m). Storage system control logic 106 is configured to abstract storage devices 110a, 110b, . . . , 110m to computing device 102. For example, storage system 104 may correspond to a RAID system and storage system control logic 106 may then correspond to a RAID controller.

Storage system control logic 106 is configured to receive read and/or write commands and associated host LBA(s) from computing device 102 (e.g., from file system 132) and to determine, select and/or identify appropriate storage device(s) 110a, 110b, . . . , and/or 110m based, at least in part, on the host LBA(s). Storage system control logic 106 may be configured to map each host LBA to one or more respective device LBA(s). In a redundant storage system, one host LBA may be mapped to device LBAs associated with more than one storage device. Storage system control logic 106 is further configured to receive user data associated with the host LBA(s). Storage system control logic 106 may receive read data from one or more storage device(s) 110a, 110b, . . . , 110m and provide the read data to computing device 102.

In write operations, storage system control logic 106 may be configured to determine and/or select appropriate storage device(s) 110a, 110b, . . . , and/or 110m based, at least in part, on the host LBA(s). For example, storage system control logic 106 may be configured to distribute user data associated with a write command across a plurality of the storage devices 110a and 110b, . . . , and/or 110m in order to provide redundancy and/or relatively better performance compared to a storage system that includes a single storage device. Thus, in this example, storage system control logic 106 may be configured to select a plurality of storage devices 110a and 110b, . . . , and/or 110m to associate with subsets of received host LBA(s). Storage system control logic 106 may be further configured to relate each subset of host LBA(s) to a respective plurality of device LBA(s) for each storage device. Storage system control logic 106 may be further configured to determine parity information, e.g., a checksum, based, at least in part, on data to be written, and to store the parity information to device LBA(s) of one or more of the storage device(s) 110*a*, 110*b*, . . . , and/or 110*m*. In another example, storage system control logic 106 may be configured to select one storage device, e.g., storage device 110*a*, to associate with the host LBAs and to receive the user data. Storage system control logic 106 may be further configured to determine parity information based, at least in part, on data to be written, and to store the parity information to another of the storage devices 110*b*, . . . , or 110*m*. In both examples, storage system control logic 106 may be configured to provide write command(s), data (e.g., user data and/or parity information) and associated device LBA(s) to selected storage device(s) 110*a*, 110*b*, . . . , and/or 110*m*.

In read operations, storage system control logic 106 is configured to identify appropriate storage device(s) 110*a*, 110*b*, . . . , and/or 110*m* and to provide read command(s) and associated device LBA(s) to identified storage device(s) 110*a*, 110*b*, . . . , and/or 110*m* based, at least in part, on host LBA(s). Storage system control logic 106 may be further configured to receive the read user data from the identified storage device(s) 110*a*, 110*b*, . . . , and/or 110*m* and to provide the read data to computing device 102. Storage system control logic 106 may be configured to verify that read data is not corrupted based, at least in part, on parity and/or redundant information associated with the read data. Storage system control logic 106 may be further configured to correct corrupted data, if possible, based, at least in part, on the parity and/or redundant information.

Storage system control logic 106 is configured to detect failure of one or more of storage devices 110*a*, 110*b*, . . . , and/or 110*m*. Storage system control logic 106 may be further configured to initiate rebuild operations in response to a detected failure. Storage system control logic 106 may be configured to communicate the failure to computing device 102. Computing device 102 and/or OS 130 may be configured to notify, e.g., a user via peripheral device(s) 140, that a storage device has failed. The notice is configured to prompt the user to replace the failed storage device with a replacement storage device. For example, storage system control logic 106 may be configured to receive an indication from a user via computing device 102 and/or peripheral device(s) 140 that a replacement storage device has been coupled to storage system control logic 106. In another example, storage system control logic 106 may be configured to detect that a replacement storage device has been coupled to storage system control logic 106 in place of the failed storage device. In another example, storage system 104 may include a replacement storage device configured to be utilized if a storage device fails. The replacement storage device may exist in storage system 104 prior to a failure of a storage device and/or may be added by the user after the failure is detected.

Generally, when rebuild operations are initiated, the failed storage device may be storing less than a maximum storage capacity of the failed storage device. In other words, fewer device LBA(s) than the span (i.e., the range of device LBAs that may store user data) of the failed storage device may be mapped. Rebuild operations may be accelerated by building mapped portions of the failed storage device rather than the entire span of the failed storage device.

In an embodiment, storage system control logic 106 may be configured to request respective state(s) of target device LBA(s) from each storage device 110*a*, 110*b*, . . . , and/or 110*m* ("target storage device(s)") that may have mapped device LBAs related to the failed storage device. Storage system control logic 106 may be configured to identify the target storage device(s) based, at least in part, on a configuration of storage system 104. Storage system control logic 106 may be further configured to identify target device LBA(s) based, at least in part, on the configuration of storage system 104. For example, in a mirrored configuration, one target storage device may include mapped LBA(s) related to the failed storage device. In another example, in a configuration that implements striping (e.g., RAID), a plurality of storage devices may include mapped device LBAs related to the failed storage device. The plurality of storage devices may be included in a storage pool. Storage system control logic 106 may be configured to identify the plurality of target storage devices based, at least in part, on the storage pool.

Storage system control logic 106 may be configured to identify the target storage device(s) and request the state(s) of target device LBA(s) in response to an indication that a storage device has failed. For example, storage system 104 may be configured to provide redundancy by mirroring stored data on a first storage device and a second storage device (e.g., RAID 1). Storage system control logic 106 may then be configured to request respective state(s) of target device LBA(s) from the second storage device if the first storage device fails. In this example, rebuild operations may then include copying data associated with the mapped device LBA(s) from the target storage device (i.e., the second storage device) to the replacement storage device.

In another example, storage system 104 may be configured to provide fault tolerance by "striping" blocks of data across a plurality of storage devices (i.e., storage pool) and distributing parity information across the plurality of storage devices (e.g., RAID 5). A stripe of data includes segments of logically sequential data that are distributed across a plurality of storage devices, i.e., a storage pool. Storage system control logic 106 may be configured to identify the plurality of storage devices in the storage pool. Storage system control logic 106 may then be configured to request respective state(s) of target device LBA(s) from each of the plurality of storage devices (except the failed storage device) in the storage pool. The state(s) of target device LBA(s) may be requested for a stripe of data. Whether to read and write the target device LBAs in the stripe may then be determined for the plurality of target storage devices in the storage pool. In this example, rebuild operations may include determining and/or verifying values of stored data based, at least in part, on the parity information. Stripes of unmapped target device LBAs may not be read nor written.

In some embodiments, file system 132 may be configured to provide a trim (TRIM) command and associated host LBA(s) 162 to storage system control logic 106. TRIM is configured to communicate host LBAs to storage system 104 that have been unmapped by the file system 132. For example, host LBAs may be unmapped in response to a permanent deletion of a file, emptying a "recycle bin" and/or performing a "quick format", e.g., in a Microsoft® Windows® OS. TRIM is configured to optimize garbage collection and erase operations in SSDs that erase blocks of storage elements prior to writing new data to the storage elements.

In these embodiments, storage system control logic 106 may be configured to send a TRIM request 160 to computing device 102 in response to a storage device failure. The TRIM request 160 is configured to trigger transmission of a TRIM command and associated host LBA(s) 162 from file system 132 to storage system 104. The TRIM command may comply and/or be compatible with one or more interface and/or interconnect protocols, as described herein. For example, the TRIM command may correspond to an ATA DATA SET MANAGEMENT command, a SCSI (and/or SAS) UNMAP command and/or an NVMe DEALLOCATE command, as described herein. Storage system control logic 106 may receive the TRIM command and associated host LBAs 162 and may provide a corresponding TRIM command and associated device LBAs 164 to the target storage device(s). For example, a host interface of each target storage device, e.g., host interface 152 of storage device 110a, may be configured to receive command(s), data and/or device LBA(s) formatted according to a respective interface and/or interconnect protocol and to provide the command(s), data and/or device LBA(s) to, e.g., device control logic 150. Device control logic of each target storage device, e.g., device control logic 150, may then be configured to unmap the device LBA(s) that correspond to received TRIM command. Thus, in response to the TRIM command the target storage device(s) may have a most up-to-date mapping (and unmapping) of device LBA(s).

Storage system control logic 106 is configured to send a request for state of target device LBA(s) command (LBA state request command) 166 to each target storage device, e.g., storage device 110a, associated with the failed storage device. In an embodiment, the LBA state request command may include one or more target device LBA(s). In another embodiment, the LBA state request command may request a listing of mapped device LBA(s) and/or a listing of unmapped device LBA(s). Storage system control logic 106 may send the LBA state request command 166 in response to a failure of a storage device, e.g., storage device 110b. For example, the LBA state request command 166 may be sent without first sending the TRIM request command 160. In another example, the LBA state request command 166 may be sent after sending the TRIM request command 160 and/or after receiving the TRIM command and associated host LBA(s) 162.

The LBA state request command 166 may correspond to and/or be compatible with one or more of the interface and/or interconnect protocols, as described herein. In some embodiments, the LBA state request command 166 may have an associated syntax that is specific to a selected storage device, e.g., storage device 110a. A specific syntax may be configured to provide a level of security by limiting use of the command to selected storage devices (e.g., vendor-specific). The specific syntax may be further configured to provide a vendor-specific command. For example, a vendor-specific command may simplify a command structure and/or facilitate device testing.

Each target storage device, e.g., storage device 110a, may be configured to provide a response 168 (i.e., reply 168) to storage system control logic 106 that includes state indicator(s) corresponding to the requested state(s) of the target device LBA(s). The repl(ies) 168 may comply and/or be compatible with one or more interface and/or interconnect protocols. For example, host interface 152 may be configured to receive the LBA state request command 166, to decode the command 166 and to provide the decoded request to device control logic 150. Device control logic 150 may be configured to identify the state(s) of target device LBA(s) based, at least in part, on map table 158. For example, map table 158 may relate device LBA(s) to NVM 156 PBA(s) and may further include a state indicator, e.g., a flag, that corresponds to a state of an associated device LBA. For example, the flag may be a bit and may have a value of one (e.g., TRUE) for a target device LBA that is mapped and a value of zero (e.g., FALSE) for a target device LBA that is unmapped. Device control logic 150 may be configured to read map table 158 and the associated indicators to identify the state(s) of target device LBA(s). Device control logic 150 may then be configured to provide the state(s) to host interface 152. Host interface 152 may then generate the reply 168 that includes the state(s) of target device LBA(s) and to transmit the response to storage system control logic 106. Responses that include the states of a plurality of target device LBA(s) may be configured to relate each state indicator to its respective target device LBA. The reply 168 may comply and/or be compatible with one or more interface and/or interconnect protocols, as described herein.

In an embodiment, storage system control logic 106 may be configured to include a target device LBA with the request for mapped and/or unmapped device LBA(s) command 166. In this embodiment, each target storage device is configured to determine a state of the target device LBA and to provide the resulting state indicator to storage system control logic 106 in reply 168. For example, the LBA state request command 166 that includes the target device LBA may be sent during rebuild, e.g., prior to building each target device LBA.

In another embodiment, storage system control logic 106 may be configured to include a range of target device LBAs with the LBA state request command 166. In this embodiment, each target storage device may be configured to determine a respective state of each device LBA included in the range of target device LBA(s) and to provide the resulting state indicator(s) to storage system control logic 106 in reply 168. For example, the LBA state request command 166 that includes the range of target device LBAs may be sent prior to and/or during rebuild, e.g., prior to building the target device LBAs.

In another embodiment, storage system control logic 106 may be configured to request a listing of mapped device LBA(s) and/or a listing of unmapped device LBA(s). In this embodiment, each target storage device may be configured to provide device LBA(s) and associated state indicators from map table 158 in their respective replies 168. For example, the LBA state request command 166 that includes the request for the listing(s) may be sent prior to rebuild.

Thus, the storage system control logic 106 may request state(s) of target device LBA(s) from target storage device(s) in response to detection of a failed storage device. The target storage device(s) may then provide the state indicator(s) of the target device LBA(s) to the storage system control logic 106 in response to the request. The storage system control logic 106 may then be configured to identify a respective state of each target device LBA. For example, storage system control logic 106 may be configured to perform a logical OR operation (e.g., exclusive OR (XOR)) of the state indicator(s) and a test value to identify the respective state(s).

Storage system control logic 106 may then be configured to build a replacement storage device, e.g., storage device 110a, configured to replace the failed storage device, e.g., storage device 110b. For example, storage system control logic 106 may be configured to send a read command that includes mapped device LBA(s) to the target storage device(s) and to write the read data to corresponding device LBA(s) of the replacement storage device 110a. Unmapped device LBA(s) may not be read and may not be written. The data may include user data and/or parity information, as described herein. Storage system control logic 106 may be further configured to update parity information associated with the replacement storage device 110a. Thus, a rebuild of the failed storage device 110b may be accelerated as described herein by reading and writing mapped device LBA(s) and not reading and not writing contents of unmapped device LBA(s). The rebuild may be performed independent of a file system, e.g., file system 130, file structure and/or partitioning related to computing device 102.

FIG. 2 is a flowchart 200 of accelerated data recovery operations according to various embodiments of the present disclosure. In particular, flowchart 200 illustrates acquiring state(s) of target device LBA(s) associated with a failed storage device and building a replacement storage device by writing the contents of the mapped device LBA(s) to the replacement storage device. The operations may be performed, for example, by storage system control logic 106 of FIG. 1.

Operations of this embodiment may begin with a storage device failure 202. In some embodiments, a TRIM command may be requested at operation 204. For example, the TRIM command may be requested from a file system included in a computing device, e.g., file system 132 of computing device 102. Target storage device(s) may be identified at operation 206. Target storage device(s) may be storing data related to the failed storage device. For example, in a mirrored system, one failed storage device may correspond to one target storage device. In another example, in a striped system, one failed storage device may be related to a plurality of target storage devices. Target device LBA(s) may be identified at operation 208. A respective state of each identified target device LBA may be requested at operation 210. For example, the respective state(s) may be requested from target storage device(s) that include data related to data stored on the failed storage device. Requested state indicator(s) may be received at operation 212. Data associated with mapped device LBA(s) may be read from the target storage device(s) and written to at least one replacement storage device at operation 214. For example, data associated with the mapped device LBA(s) may include user data and/or parity information. Program flow may then continue at operation 216.

Thus, a rebuild of a failed storage device may be accelerated by copying data associated with mapped device LBA(s) from target storage device(s) (i.e., reading) to the replacement storage device (i.e., writing). Whether a device LBA is mapped or unmapped may be determined based, at least in part, on LBA state information received from the target storage device(s).

FIG. 3 is a flowchart 300 of storage device operations according to various embodiments of the present disclosure. In particular, flowchart 300 illustrates unmapping device LBA(s) in response to a TRIM command and providing respective state(s) of target device LBA(s) in response to a request for them. The operations may be performed by a storage device, for example, one or more of storage device(s) 110a, 110b, ..., and/or 110m of FIG. 1.

Operations of this embodiment may begin with start 302. In some embodiments, a TRIM command may be received at operation 304. The TRIM command is configured to identify device LBA(s) that correspond to host LBA(s) that have been unmapped by, e.g., a file system. Device LBA(s) associated with the TRIM command may be unmapped at operation 306. Whether operations 304 and 306 are performed may depend on whether an OS, e.g., OS 130, includes a TRIM command.

Operations of this embodiment include receiving a request for state(s) of target device LBA(s) at operation 308. One or more state(s) of target device LBA(s) may be determined in response to the request at operation 310. For example, state(s) of target device LBA(s) may be determined based, at least in part, on a map table, e.g., map table 158 of FIG. 1. Operation 312 includes providing a reply that includes a respective state indicator related to the state of each target device LBA. For example, the response may be provided to storage system control logic. Program flow may end at operation 314. Thus, a storage device may provide respective state indicator(s) of one or more target device LBA(s) in response to a request from, e.g., storage system control logic.

While the flowcharts of FIGS. 2 and 3 illustrate operations according various embodiments, it is to be understood that not all of the operations depicted in FIGS. 2 and/or 3 are necessary for other embodiments. In addition, it is fully contemplated herein that in other embodiments of the present disclosure, the operations depicted in FIGS. 2 and/or 3, and/or other operations described herein may be combined in a manner not specifically shown in any of the drawings, and such embodiments may include less or more operations than are illustrated in FIGS. 2 and/or 3. Thus, claims directed to features and/or operations that are not exactly shown in one drawing are deemed within the scope and content of the present disclosure.

Figure 4A:
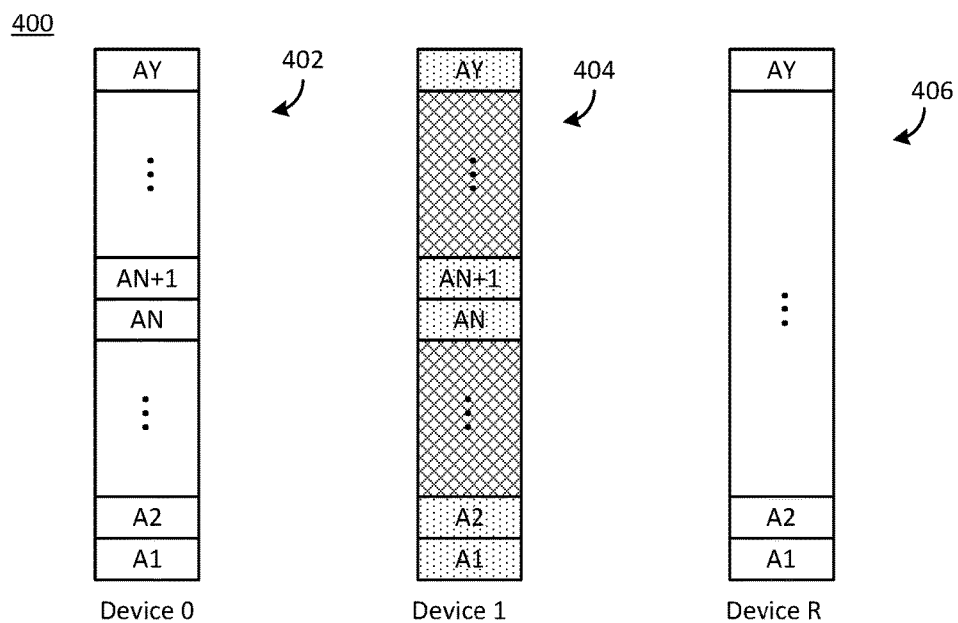
FIGS. 4A and 4B illustrate one example of accelerated data recovery in a RAID (redundant array of independent (inexpensive) disks) level 1 system.
Figure 4B:
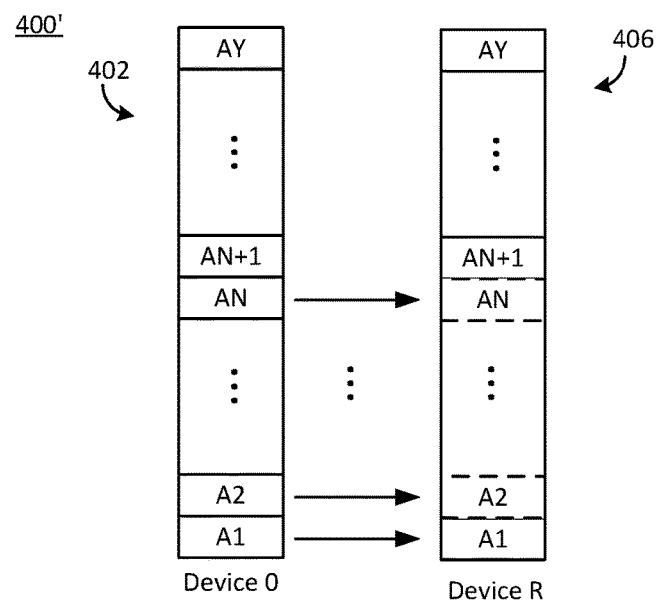

FIGS. 4A and 4B illustrate one example of accelerated data recovery in a RAID level 1 (i.e., mirrored) system. FIG. 4A illustrates an example 400 of NVM 402, 404 of a RAID 1 that includes two storage devices (Device 0 and Device 1) configured to mirror stored data. In other words, the NVM 402, 404 of each device is configured to store the same data as the NVM 404, 402 of the other device. In both devices, device LBA(s) A1, A2, ..., AN are mapped and LBA(s) AN+1, ..., AY are unmapped. In example 400, Device 1 has failed. Example 400 further includes a replacement device (Device R) that is configured to replace failed Device 1. Device R includes NVM 406 that includes device LBA(s) A1, A2, ..., AY that are unmapped. In other words the span of NVM 406 is unmapped. A user may remove failed Device 1 and replace Device 1 with Device R.

FIG. 4B illustrates the example 400' of FIG. 4A after the failed Device 1 has been replaced with Device R. Storage system control logic, e.g., storage system control logic 106 of FIG. 1, is configured to request state(s) of target device LBA(s) from Device 0, for example, by sending a LBA state request command to Device 0, as described herein. Device 0 is configured to receive the request and to transmit respective state indicator(s) of device LBA(s), A1, A2, ..., AN (i.e., mapped), to the storage system control logic in response to receiving the LBA state request command, as described herein. The storage system control logic may then be configured to copy the data associated with mapped device LBA(s) A1, A2, ..., AN from NVM 402 to NVM 406. Device LBA(s) AN+1, ..., AY of NVM 406 may remain unmapped. Thus, rebuilding a failed storage device may be accelerated, as described herein, compared to copying the full span.

Turning again to FIG. 1, OS 130 may be configured to manage system 100 resources and control tasks that are run on each respective device and/or system, e.g., computing device 102 and/or storage system 104. For example, the OS may be implemented using Microsoft® Windows®, HP-UX®, Linux®, or UNIX®, although other operating systems may be used. In some embodiments, the OS 130 may be replaced by a virtual machine monitor (or hypervisor)

which may provide a layer of abstraction for underlying hardware to various operating systems (virtual machines) running on one or more processing units.

Memory 126 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively device memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

Computing device 102 and storage system 104 may be configured to communicate with each other via one or more interface and/or interconnect protocols. Storage system control logic 106 and storage device(s) 110a, 110b, . . . , and/or 110m may be configured to communicate with each other via one or more interface and/or interconnect protocols.

In one example, the interface and/or interconnect protocol may comply and/or be compatible with PCIe® (Peripheral Component Interconnect Express) specification, titled: PCI Express® Base Specification, Revision 3.0, released by PCI-SIG® (PCI Special Interest Group), Beaverton, Oreg., November 2010, and/or later versions of this specification, for example, version 3.1.

In another example, the interface and/or interconnect protocol may comply and/or be compatible with SAS (Serial Attached SCSI (Small Computer System Interface)) standard SAS-3, titled: Serial Attached SCSI-3 (SAS-3) 2212-D ANSI-approved, published by American National Standards Institute (ANSI) InterNational Committee for Information Technology Standards (INCITS), November, 2013, and/or later versions of this standard.

In another example, the interface and/or interconnect protocol may comply and/or be compatible with ATA (Advanced Technology Attachment) standard, document number: INCITS 452-2009/AM1-2010, titled: Information Technology-AT Attachment 8-ATA/ATAPI Command Set (ATA8-ACS) Amendment 1, published in 2010 by ANSI INCITS, and/or related and/or later versions of this standard, for example, document number: INCITS 482-2012, titled: Information Technology-ATA/ATAPI Command Set-2 (ACS-2), published in 2012, and/or later and/or related versions of this standard.

In another example, the interface and/or interconnect protocol may comply and/or be compatible with SATA (Serial ATA (Advanced Technology Attachment)) specification, titled: Serial ATA Specification, Revision 3.2, released August 2013, by SATA International Organization (SATA-IO), Beaverton, Oreg., and/or earlier and/or later versions of this specification.

In another example, the interface and/or interconnect protocol may comply and/or be compatible with NVMe (Non-Volatile Memory Host Controller Interface Express) specification titled: NVM Express™, Revision 1.2, released Nov. 3, 2014 by NVM Express™ Work Group, and/or earlier and/or later versions of this specification.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

Thus, consistent with the teachings of the present disclosure, a system and method are configured to provide an accelerated rebuild of a replacement storage device by reading and writing (e.g., copying) data associated with mapped device LBA(s). In other words, rather than copying all device LBAs associated with the failed storage device to the replacement storage device, the data associated with device LBA(s) determined to be mapped may be copied. Thus, a time duration associated with rebuilding the failed storage device may be reduced relative to copying an entire span of a storage device. By requesting state(s) of target device LBA(s) from the storage device(s), such rebuilds may be performed independent of existence and/or type of file system that may be resident on a host computing device coupled to the storage system.

EXAMPLES

Examples of the present disclosure include subject material such as a method, means for performing acts of the method, a device, or of an apparatus or computer-readable storage device related to accelerated data recovery in a storage system, as discussed below.

Example 1

According to this example there is provided a storage system. The storage system includes storage system control logic. The storage system control logic is to identify at least one target storage device in response to detection of a failed storage device, request a state of a target device logical block address (LBA) from each of the at least one target storage device, and read data associated with a mapped device LBA from each target storage device and write the data to at least one replacement storage device.

Example 2

This example includes the elements of example 1, wherein the storage system control logic is further to request a trim command (TRIM) from a computing device to be provided to each target storage device.

Example 3

This example includes the elements of example 1, wherein the storage system control logic is further to identify each target device LBA.

Example 4

This example includes the elements of example 1, wherein the storage system control logic is further to request from each target storage device a respective state of each target device LBA of a range of target device LBAs.

Example 5

This example includes the elements of example 1, wherein the storage system control logic is further to request a listing of mapped device LBAs from each target storage device.

Example 6

This example includes the elements of example 1, wherein the state corresponds to mapped or unmapped.

Example 7

This example includes the elements according to any one of examples 1 through 6, wherein the storage system control logic is to request the state of each target device LBA at least one of prior to and/or during a rebuild of the failed storage device.

Example 8

This example includes the elements according to any one of examples 1 through 6, wherein the request includes a respective target device LBA and the storage system control logic is to receive an indicator related to the state of the respective target device LBA.

Example 9

This example includes the elements according to any one of examples 1 through 6, wherein the request includes a range of target device LBAs and the storage system control logic is to receive indicators related to the respective state of each target device LBA in the range of target device LBAs.

Example 10

This example includes the elements according to any one of examples 1 through 6, wherein the storage system control logic is further to determine parity information based, at least in part, on the data associated with the mapped device LBA.

Example 11

According to this example there is provided a storage device. The storage device includes device control logic to determine a state of a target device logical block address (LBA) in response to a request; a host interface to provide a reply to the request, the reply including a state indicator related to the state of the target device LBA; a map table including a plurality of device LBAs and respective state indicators; and non-volatile memory (NVM) including data related to at least one mapped LBA.

Example 12

This example includes the elements of example 11, wherein the device control logic is to unmap a device LBA in response to a receiving trim command (TRIM).

Example 13

This example includes the elements of example 11, wherein the device control logic is further to determine a respective state of each target device LBA of a range of target device LBAs in response to the request.

Example 14

This example includes the elements of example 11, wherein the device control logic is further to determine a respective state of each device LBA of the plurality of device LBAs in response to the request.

Example 15

This example includes the elements of example 14, wherein the reply includes at least a portion of the plurality of device LBAs and a respective state of each device LBA in the portion is mapped.

Example 16

This example includes the elements of example 11, wherein the state corresponds to mapped or unmapped.

Example 17

This example includes the elements according to any one of examples 11 through 16, wherein the host interface is compatible with at least one of PCIe® (Peripheral Component Interconnect Express), SAS (Serial Attached SCSI (Small Computer System Interface)), ATA (Advanced Technology Attachment), SATA (Serial ATA) and/or NVMe (Non-Volatile Memory Host Controller Interface Express).

Example 18

This example includes the elements according to any one of examples 11 through 16, wherein the NVM includes one or more of magnetoresistive random access memory (MRAM), phase change memory (PCM, PRAM), three dimensional crosspoint memory, resistive memory, ferroelectric memory (F-RAM, FeRAM), spin-transfer torque memory (STT), thermal assisted switching memory (TAS), millipede memory, floating junction gate memory (FJG RAM), magnetic tunnel junction (MTJ) memory, electrochemical cells (ECM) memory, binary oxide filament cell memory, interfacial switching memory, battery-backed RAM and/or NAND flash memory.

Example 19

This example includes the elements according to any one of examples 11 through 16, wherein the host interface is to couple the storage device to at least one of a storage system controller logic and/or a computing device.

Example 20

This example includes the elements according to any one of examples 11 through 16, wherein the request is received from and the reply is provided to storage system control logic.

Example 21

According to this example there is provided a method. The method includes identifying, by storage system control logic, at least one target storage device in response to detection of a failed storage device; requesting, by storage system control logic, a state of a target device logical block address (LBA) from each of the at least one target storage device; reading, by storage system control logic, data associated with a mapped device LBA from each target storage device; and writing, by storage system control logic, the data to at least one replacement storage device.

Example 22

This example includes the elements of example 21 and further includes requesting, by storage system control logic, a trim command (TRIM) from a computing device to be provided to each target storage device.

Example 23

This example includes the elements of example 21 and further includes identifying, by storage system control logic, each target device LBA.

Example 24

This example includes the elements of example 21 and further includes requesting, by storage system control logic, from each target storage device a respective state of each target device LBA of a range of target device LBAs.

Example 25

This example includes the elements of example 21 and further includes requesting, by storage system control logic, a listing of mapped device LBAs from each target storage device.

Example 26

This example includes the elements of example 21, wherein the state corresponds to mapped or unmapped.

Example 27

This example includes the elements of example 21 and further includes requesting, by storage system control logic, the state of each target device LBA at least one of prior to and/or during a rebuild of the failed storage device.

Example 28

This example includes the elements of example 21, wherein the request includes a respective target device LBA and further including receiving, by storage system control logic, an indicator related to the state of the respective target device LBA.

Example 29

This example includes the elements of example 21, wherein the request includes a range of target device LBAs and further including receiving, by storage system control logic, indicators related to the respective state of each target device LBA in the range of target device LBAs.

Example 30

This example includes the elements of example 21 and further includes determining, by storage system control logic, parity information based, at least in part, on the data associated with the mapped device LBA.

Example 31

According to this example there is provided a method. The method includes determining, by device control logic, a state of a target device logical block address (LBA) in response to a request based, at least in part, on a map table including a plurality of device LBAs and respective state indicators, the map table related to a non-volatile memory (NVM) that includes data related to at least one mapped LBA; and providing, by a host interface, a reply to the request, the reply including a state indicator related to the state of the target device LBA.

Example 32

This example includes the elements of example 31 and further includes unmapping, by the device control logic, a device LBA in response to a receiving trim command (TRIM).

Example 33

This example includes the elements of example 31 and further includes determining, by the device control logic, a respective state of each target device LBA of a range of target device LBAs in response to the request.

Example 34

This example includes the elements of example 31 and further includes determining, by the device control logic, a respective state of each device LBA of the plurality of device LBAs in response to the request.

Example 35

This example includes the elements of example 34, wherein the reply includes at least a portion of the plurality of device LBAs and a respective state of each device LBA in the portion is mapped.

Example 36

This example includes the elements of example 31, wherein the state corresponds to mapped or unmapped.

Example 37

This example includes the elements of example 31, wherein the reply is compatible with at least one of PCIe® (Peripheral Component Interconnect Express), SAS (Serial Attached SCSI (Small Computer System Interface)), ATA (Advanced Technology Attachment), SATA (Serial ATA) and/or NVMe (Non-Volatile Memory Host Controller Interface Express).

Example 38

This example includes the elements of example 31, wherein the NVM includes one or more of magnetoresistive random access memory (MRAM), phase change memory (PCM, PRAM), three dimensional crosspoint memory, resistive memory, ferroelectric memory (F-RAM, FeRAM), spin-transfer torque memory (STT), thermal assisted switching memory (TAS), millipede memory, floating junction gate memory (FJG RAM), magnetic tunnel junction (MTJ) memory, electrochemical cells (ECM) memory, binary oxide filament cell memory, interfacial switching memory, battery-backed RAM and/or NAND flash memory.

Example 39

This example includes the elements of example 31 and further includes coupling, by the host interface, a storage device to at least one of a storage system controller logic and/or a computing device.

Example 40

This example includes the elements of example 31, wherein the request is received from and the reply is provided to storage system control logic.

Example 41

According to this example there is provided a computer-readable storage device having stored thereon instructions that when executed by one or more processors result in the following operations including identifying at least one target storage device in response to detection of a failed storage device; requesting a state of a target device logical block address (LBA) from each of the at least one target storage device; reading data associated with a mapped device LBA from each target storage device; and writing the data to at least one replacement storage device.

Example 42

This example includes the elements of example 41, wherein the instructions that when executed by one or more processors results in the following additional operations including requesting a trim command (TRIM) from a computing device to be provided to each target storage device.

Example 43

This example includes the elements of example 41, wherein the instructions that when executed by one or more processors results in the following additional operations including identifying each target device LBA.

Example 44

This example includes the elements of example 41, wherein the instructions that when executed by one or more processors results in the following additional operations including requesting from each target storage device a respective state of each target device LBA of a range of target device LBAs.

Example 45

This example includes the elements of example 41, wherein the instructions that when executed by one or more processors results in the following additional operations including requesting a listing of mapped device LBAs from each target storage device.

Example 46

This example includes the elements of example 41, wherein the state corresponds to mapped or unmapped.

Example 47

This example includes the elements according to any one of examples 41 through 46, wherein the instructions that when executed by one or more processors results in the following additional operations including requesting the state of each target device LBA at least one of prior to and/or during a rebuild of the failed storage device.

Example 48

This example includes the elements according to any one of examples 41 through 46, wherein the request includes a respective target device LBA and the instructions that when executed by one or more processors results in the following additional operations including receiving an indicator related to the state of the respective target device LBA.

Example 49

This example includes the elements according to any one of examples 41 through 46, wherein the request includes a range of target device LBAs and the instructions that when executed by one or more processors results in the following additional operations including receiving indicators related to the respective state of each target device LBA in the range of target device LBAs.

Example 50

This example includes the elements according to any one of examples 41 through 46, wherein the instructions that when executed by one or more processors results in the following additional operations including determining parity information based, at least in part, on the data associated with the mapped device LBA.

Example 51

According to this example there is provided a computer-readable storage device having stored thereon instructions that when executed by one or more processors result in the following operations including determining a state of a target device logical block address (LBA) in response to a request, based, at least in part, on a map table including a plurality of device LBAs and respective state indicators, the map table related to a non-volatile memory (NVM) that includes data related to at least one mapped LBA; and providing a reply to the request, the reply including a state indicator related to the state of the target device LBA.

Example 52

This example includes the elements of example 51, wherein the instructions that when executed by one or more processors results in the following additional operations including unmapping a device LBA in response to a receiving trim command (TRIM).

Example 53

This example includes the elements of example 51, wherein the instructions that when executed by one or more processors results in the following additional operations including determining a respective state of each target device LBA of a range of target device LBAs in response to the request.

Example 54

This example includes the elements of example 51, wherein the instructions that when executed by one or more processors results in the following additional operations including determining a respective state of each device LBA of the plurality of device LBAs in response to the request.

Example 55

This example includes the elements of example 54, wherein the reply includes at least a portion of the plurality of device LBAs and a respective state of each device LBA in the portion is mapped.

Example 56

This example includes the elements of example 51, wherein the state corresponds to mapped or unmapped.

Example 57

This example includes the elements according to any one of examples 51 through 56, wherein the reply is compatible with at least one of PCIe® (Peripheral Component Interconnect Express), SAS (Serial Attached SCSI (Small Computer System Interface)), ATA (Advanced Technology Attachment), SATA (Serial ATA) and/or NVMe (Non-Volatile Memory Host Controller Interface Express).

Example 58

This example includes the elements according to any one of examples 51 through 56, wherein the NVM includes one or more of magnetoresistive random access memory (MRAM), phase change memory (PCM, PRAM), three dimensional crosspoint memory, resistive memory, ferroelectric memory (F-RAM, FeRAM), spin-transfer torque memory (STT), thermal assisted switching memory (TAS), millipede memory, floating junction gate memory (FJG RAM), magnetic tunnel junction (MTJ) memory, electrochemical cells (ECM) memory, binary oxide filament cell memory, interfacial switching memory, battery-backed RAM and/or NAND flash memory.

Example 59

This example includes the elements according to any one of examples 51 through 56, wherein the instructions that when executed by one or more processors results in the following additional operations including coupling a storage device to at least one of a storage system controller logic and/or a computing device.

Example 60

This example includes the elements according to any one of examples 51 through 56, wherein the request is received from and the reply is provided to storage system control logic.

Example 61

According to this example there is computer-readable storage device having stored thereon instructions that when executed by one or more processors result in the following operations including the method according to any one of examples 21 to 30.

Example 62

According to this example there is computer-readable storage device having stored thereon instructions that when executed by one or more processors result in the following operations including the method according to any one of examples 31 to 40.

Example 63

Another example of the present disclosure is a system including at least one device arranged to perform the method of any one of examples 21 to 30.

Example 64

Another example of the present disclosure is a system including at least one device arranged to perform the method of any one of examples 31 to 40.

Example 65

Another example of the present disclosure is a device including means to perform the method of any one of examples 21 to 30.

Example 66

Another example of the present disclosure is a device including means to perform the method of any one of examples 31 to 40.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. One or more non-transitory computer-readable storage media having instructions stored thereon that when executed by at least one processor to cause the at least one processor of a first computing device to perform operations, comprising:
   detect a failed storage device in a plurality of storage devices;
   identify at least one target storage device of the plurality of storage devices;
   identify mapped logical block addresses (LBAs) of the at least one target storage device, the at least one target storage device to have associated mapped and unmapped LBAs; and
   responsive to the detection of the failed storage device:
      without reading data associated with the unmapped LBAs, read data associated with the mapped LBAs from the at least one target storage device; and
      without writing data associated with the unmapped LBAs, write the data associated with the mapped LBAs to at least one replacement storage device in the plurality of storage devices;
   wherein at least one of the unmapped LBAs is an LBA that has not been written to or has been subject to an UNMAP command and has not been written to since the UNMAP command.

2. The one or more non-transitory computer-readable storage media of claim 1, wherein at least one of the mapped LBAs is an LBA that has been subject to a write operation and has not been subject to an UNMAP command since the write operation.

3. The one or more non-transitory computer-readable storage media of claim 1, wherein the UNMAP command is a TRIM command.

4. The one or more non-transitory computer-readable storage media of claim 1, wherein the UNMAP command is a Small Computer System Interface (SCSI) command.

5. The one or more non-transitory computer-readable storage media of claim 1, wherein the at least one target storage device is at least one solid state drive (SSD).

6. The one or more non-transitory computer-readable storage media of claim 1, wherein the instructions, when executed by the at least one processor of the first computing device, result in additional operations comprising:
   request an UNMAP command from a computing device to be provided to at least one target storage device.

7. The one or more non-transitory computer-readable storage media of claim 1, wherein the instructions, when executed by the at least one processor of the first computing device, result in additional operations comprising:
   identify a state of at least one LBA in the at least one target storage device, said state being mapped or unmapped.

8. The one or more non-transitory computer-readable storage media of claim 7, wherein the instructions, when executed by the at least one processor of the first computing device, result in additional operations comprising:
   identify a state of at least one target storage device LBA in a range of target storage device LBAs, said state being mapped or unmapped.

9. The one or more non-transitory computer-readable storage media of claim 8, wherein the instructions, when executed by the at least one processor of the first computing device, result in additional operations comprising:
   cause device control logic of the at least one storage device to provide a listing of mapped LBAs in at least one target storage device.

10. The one or more non-transitory computer-readable storage media of claim 9, wherein the device control logic is further to unmap a device LBA in response to an UNMAP command.

11. A device, comprising:
    storage device interface circuitry to communicate with a plurality of storage devices; and
    storage system control logic to:
       detect a failed storage device in the plurality of storage devices;
       identify at least one target storage device of the plurality of storage devices;
       identify mapped logical block addresses (LBAs) of the at least one target storage device, the at least one target storage device to have associated mapped and unmapped LBAs; and
       responsive to the detection of the failed storage device:
          without reading data associated with the unmapped LBAs, read data associated with the mapped LBAs from the at least one target storage device; and
          without writing data associated with the unmapped LBAs, write the data associated with the mapped LBAs to at least one replacement storage device;
       wherein at least one of the unmapped LBAs is an LBA that has not been written to or has been subject to an UNMAP command and has not been written to since the UNMAP command.

12. The device of claim 11, wherein at least one of the mapped LBAs is an LBA that has been subject to a write operation and has not been subject to an UNMAP command since the write operation.

13. The device of claim 11, wherein the UNMAP command is a TRIM command.

14. The device of claim 11, wherein the UNMAP command is a Small Computer System Interface (SCSI) command.

15. The device of claim 11, wherein the at least one target storage device is at least one solid state drive (SSD).

16. The device of claim 11, wherein the storage system control logic is further to request an UNMAP command from a computing device to be provided to at least one target storage device.

17. The device of claim 11, wherein the storage system control logic is further to identify a state of at least one LBA in the at least one target storage device, said state being mapped or unmapped.

18. The device of claim 17, wherein the storage system control logic is further to identify a state of at least one target storage device LBA in a range of target storage device LBAs, said state being mapped or unmapped.

19. The device of claim 18, wherein the storage system control logic is further to cause device control logic of at least one storage device to provide a listing of mapped LBAs in at least one target storage device.

20. The device of claim 19, wherein the storage system control logic is further to unmap a device LBA in response to an UNMAP command.

21. A system, comprising:
a storage system, including:
   a plurality of storage devices; and
   storage system control logic to:
      detect a failed storage device in the plurality of storage devices;
      identify at least one target storage device of the plurality of storage devices;
      identify mapped logical block addresses (LBAs) of the at least one target storage device, the at least one target storage device to have associated mapped and unmapped LBAs; and
      responsive to the detection of the failed storage device:
         without reading data associated with the unmapped LBAs, read data associated with the mapped LBAs from the at least one target storage device; and
         without writing data associated with the unmapped LBAs, write the data associated with the mapped LBAs to at least one replacement storage device;
      wherein at least one of the unmapped LBAs is an LBA that has not been written to or has been subject to an UNMAP command and has not been written to since the UNMAP command; and
   a computing device, including:
      a processor; and
      chipset circuitry to couple the processor to the storage system.

22. The system of claim 21, further comprising a display, wherein the chipset circuitry is further to couple the processor to the display.

23. The system of claim 21, wherein the storage system control logic is further to identify a state of at least one LBA in the at least one target storage device, said state being mapped or unmapped.

24. The system of claim 23, wherein the storage system control logic is further to identify a state of at least one target storage device LBA in a range of target storage device LBAs, said state being mapped or unmapped.

25. The system of claim 24, wherein the storage system control logic is further to cause device control logic of at least one storage device to provide a listing of mapped LBAs in at least one target storage device.

* * * * *